March 30, 1943.　　　　G. D. STAHL　　　　2,314,906

TIME CONTROL APPARATUS

Filed Nov. 23, 1940　　　　6 Sheets-Sheet 2

INVENTOR
GUSTAVE D. STAHL
BY
Ira L. Nickerson
ATTORNEY

March 30, 1943.     G. D. STAHL     2,314,906
TIME CONTROL APPARATUS
Filed Nov. 23, 1940     6 Sheets-Sheet 3

INVENTOR
GUSTAVE D. STAHL
BY
Ira L. Nickerson
ATTORNEY

March 30, 1943.　　　G. D. STAHL　　　2,314,906
TIME CONTROL APPARATUS
Filed Nov. 23, 1940　　　6 Sheets-Sheet 4
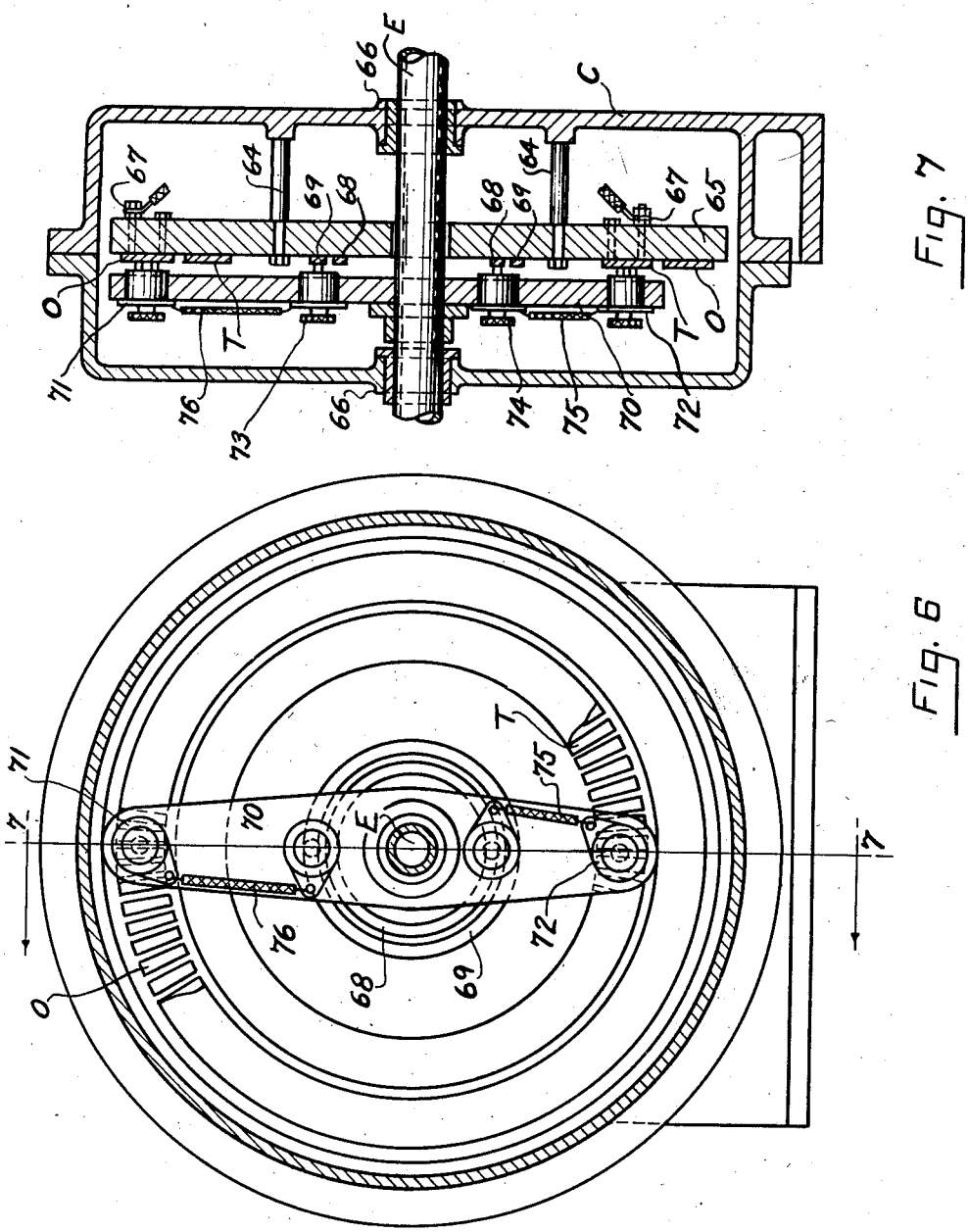
INVENTOR
GUSTAVE D. STAHL
BY
Ira L. Nickerson
ATTORNEY

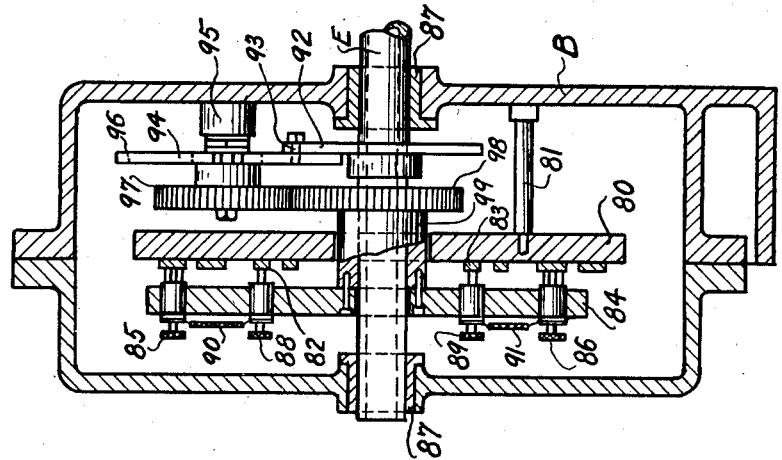
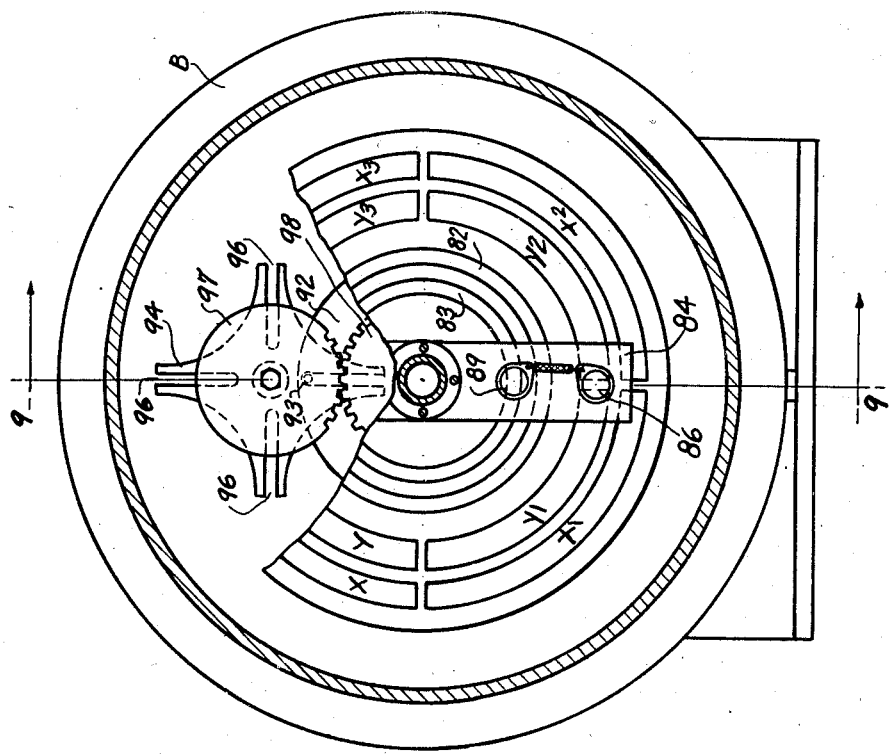

March 30, 1943.  G. D. STAHL  2,314,906
TIME CONTROL APPARATUS
Filed Nov. 23, 1940  6 Sheets-Sheet 6

INVENTOR
GUSTAVE D. STAHL
BY
Ira L. Nickerson
ATTORNEY

Patented Mar. 30, 1943

2,314,906

UNITED STATES PATENT OFFICE 2,314,906

TIME CONTROL APPARATUS

Gustave D. Stahl, Melrose Highlands, Mass., assignor, by mesne assignments, to Houdry Process Corporation, Wilmington, Del., a corporation of Delaware Application November 23, 1940, Serial No. 366,831

12 Claims. (Cl. 172—239)

This invention relates to a system and apparatus for controlling and regulating a cycle of process steps which are effected in timed sequence and in particular it is concerned with controlling the time periods in which different fluid mediums are supplied to a chamber. In certain respects the invention relates to the subject matter disclosed in the copending application of Henry Thomas, John M. Pearson and Edward J. Nopper, Serial No. 160,122, filed August 20, 1937, for Cycle timer apparatus (Patent No. 2,250,507 issued July 29, 1941) and also to the application of Henry J. Appel, Serial No. 218,794, filed July 12, 1938, for Successive switching arrangement (Patent No. 2,250,453 issued July 29, 1941), each of which shows a system of control wherein a valve operation is tested at a predetermined time after the valve operation had been initiated.

One object of the invention is to provide time control apparatus which is adapted for processes having a great number of steps as well as for processes having varying numbers of steps. Another object is to provide improved means for initiating the process steps and for determining the proper operation of the steps after they have been initiated. Another object is to provide an improved system of control and apparatus therefor to prevent the operation of any mechanism out of sequence. Another object is to provide time control apparatus which is compactly constructed yet is capable of controlling processes involving a large number of operations, and another object is to provide electrical control apparatus which may safely be used under hazardous or explosive conditions. Other objects will become apparent from a clear understanding of the detailed description of the invention.

In its broadest aspects the present apparatus for controlling a cycle of process steps comprises a plurality of sets of power distributors or contacts which are in electrical circuit with the mechanisms, such as valves, which are to be operated in order to effect the process steps, and an independent power selector is provided for each of the sets of contacts. Means are also provided for supplying power from a source to the power selectors in timed sequence so that the sets of contacts or distributors will become energized in timed sequence and each set will function separately and in its turn for effecting the operation of the mechanisms with which its contacts are in circuit.

By providing a plurality of contact or distributor sets the apparatus is made flexible since sets may be added or removed at will, depending upon the number of steps in any particular process cycle and also the sets of contacts may be mounted on relatively small panels or discs which permits the various parts of the apparatus to be compactly assembled.

For a complete understanding of the invention reference may be made to the accompanying drawings wherein:

Fig. 6 is an enlarged sectional view taken on the line 6—6 of Fig. 1;

Fig. 7 is a sectional view taken generally on the line 7—7 of Fig. 6;

Fig. 8 is an enlarged sectional view taken on the line 8—8 of Fig. 1 with portions removed to show details;

Fig. 9 is a sectional view taken generally on the line 9—9 of Fig. 8; and

Figure 1:
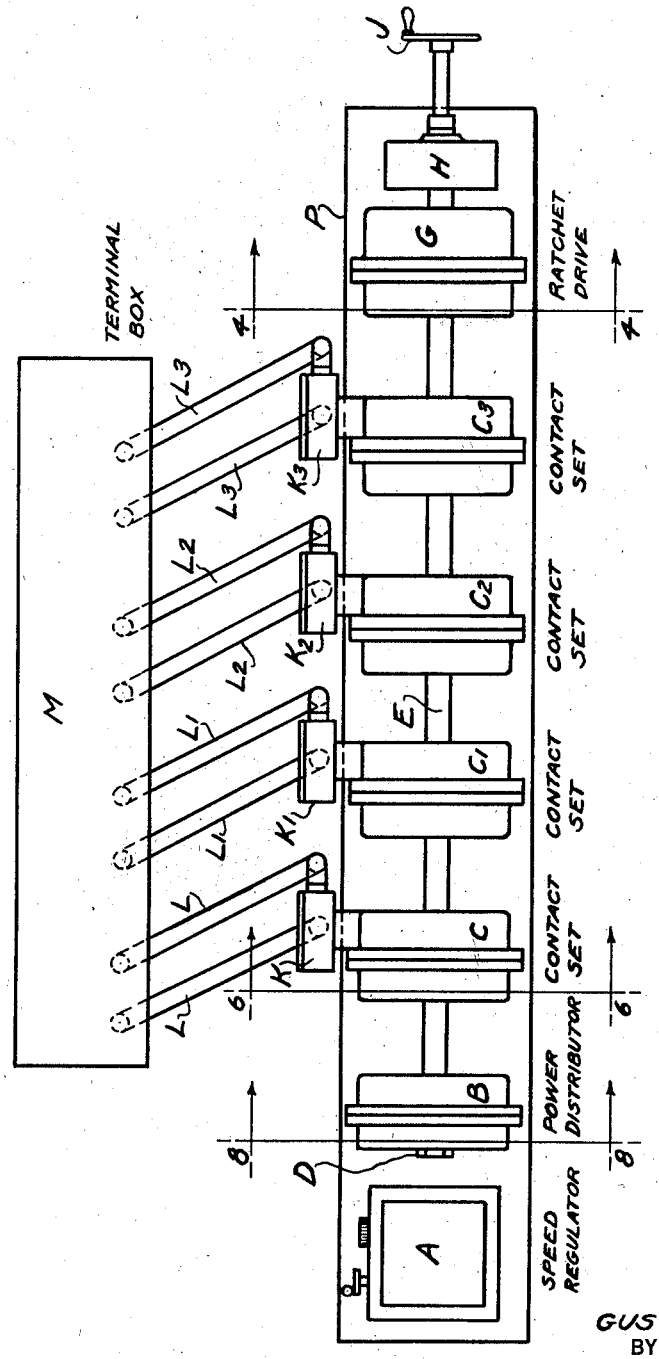
Fig. 1 is a diagrammatic view of the apparatus in assembled condition and showing conduits for electrical connections from the contact sets to a main terminal box.

In Fig. 1 the various parts of the apparatus are shown assembled in one convenient manner and they comprise, reading from left to right, a time controller or speed regulator A which may be set to operate in accordance with the time period of a particular process cycle to carry out the timed process steps. At B is indicated a casing for the power selectors which deliver current from a source to independent sets of contacts, one of which sets is disposed in each of the casings C, $C_1$, $C_2$, $C_3$. The number of power selectors in casing B will always be equal to the number of contact sets and in the exemplary embodiment shown four separate and independent selectors are provided in casing B, one for each of the contact sets. Each selector will be in circuit with a contact set and current from the source will be supplied to the selectors in sequence and from the selectors to the contact sets in sequence. As shown, the casing B for the selectors and casings C, $C_1$, $C_2$, $C_3$ for the contact sets are mounted on the shaft E which carries suitable means (to be later described) for sequentially engaging the selectors and contact sets, respectively. The shaft E may be rotated by any suitable means but as indicated at G a ratchet device is provided to give intermittent motion to the shaft, or the shaft may be rotated by hand through a clutch H and crank J, as indicated. Wire ducts K, K1, K2, K3 are provided on the casings C, C1, C2, C3 for assembling leads from the contact sets and wire conduits L, L1, L2, L3 carry the electrical connections from the leads to the main terminal box M. From M connections will extend to the various mechanisms or valves which are to be operated. The parts of the apparatus so far described comprise casings which contain the various operating elements and which may be supported on a suitable foundation P. These casings will be constructed so as to be practically airtight or at least will have their parts so close fitting as to prevent any sparking or explosions occurring within the casings from reaching outside the casings and consequently will permit the apparatus to be used for controlling processes involving inflammable fluids.

The apparatus elements as shown in Figs. 2 through 9, are now to be described in one particular arrangement but it is to be understood that this is only one of a number of arrangements which could be utilized to carry out the the broader aspects of the invention.

Figure 2:
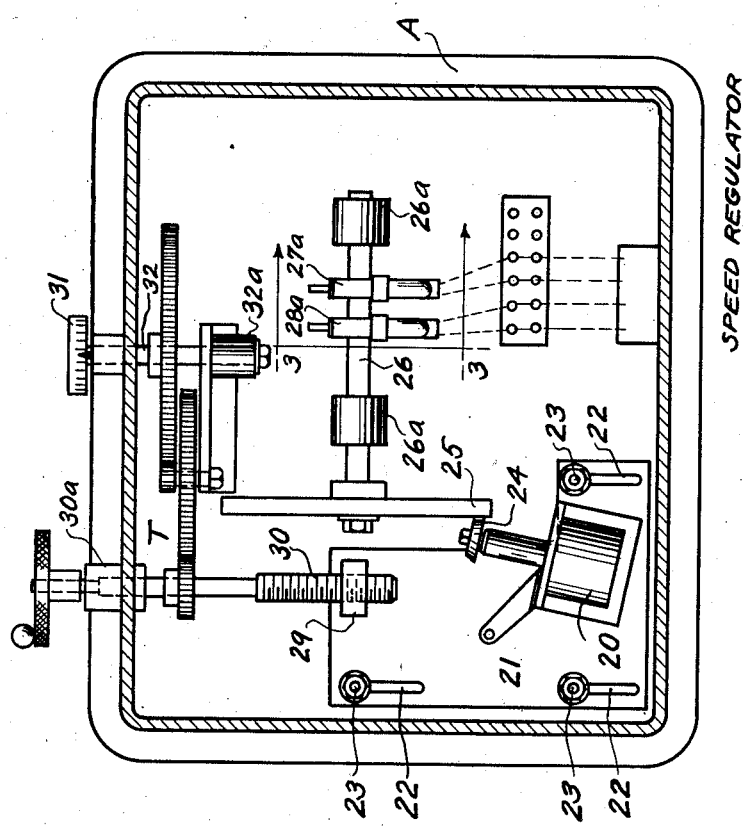
Fig. 2 is a plan view of speed regulator A in Fig. 1 with its cover removed to show details.
Figure 3:
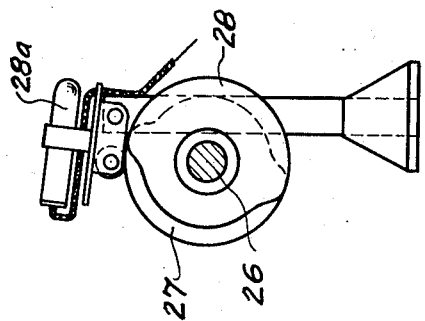
Fig. 3 is a sectional view taken on the line 3—3 of Fig. 2.

The speed regular A shown in detail in Figs. 2 and 3 consists of a synchronous motor 20 which is mounted in the casing on a panel 21 which has elongate slots 22 therein and through which extend bolts 23 from a wall of the casing for adjustably securing the panel in the casing. The motor 20 rotates a driving head 24 which, in turn, rotates a friction disc 25 to which is fixed a shaft 26 rotatable in bearings 26a and carrying cams 27 and 28 (shown in Fig. 3) which are positioned thereon to tilt, respectively, mercury switches 27a and 28a in alternation for controlling operations later to be described. The speed of rotation of shaft 26 and consequently the frequency of the tilting of the mercury switches is varied by adjusting the position of the driving head 24 relative to the friction disc 25 which is done by means of the follower 29 secured to panel 21 and the lead screw 30 which is rotatable in bearing 30a. The extent of raising or lowering of the head 24 by means of the follower 29 and lead screw 30 is registered on a graduated dial 31 which is operated by rotation of shaft 32 in bearing 32a from the screw 30 through a suitable gear train indicated generally at T in Fig. 2.

Figure 5:
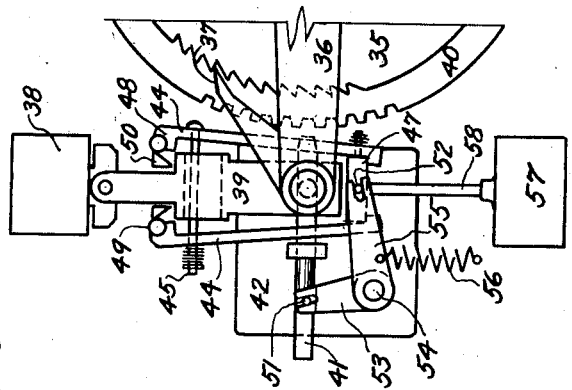
Fig. 5 is a view of a portion of Fig. 4 shown in an adjusted position.
Figure 4:
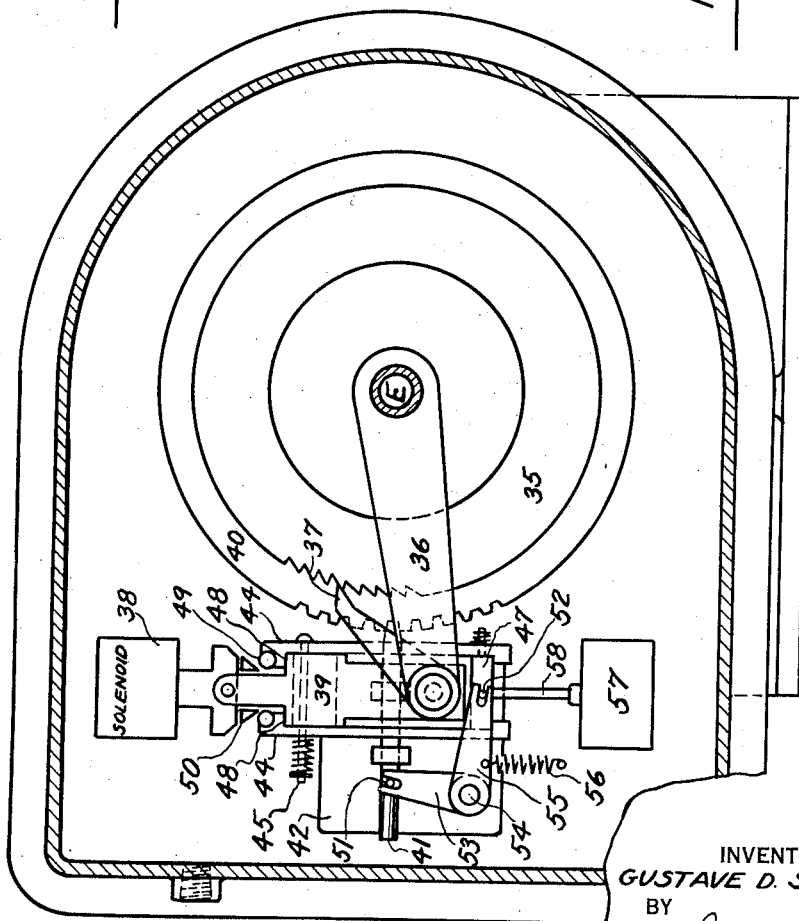
Fig. 4 is an enlarged sectional view taken generally on the line 4—4 of Fig. 1 with portions broken away to show details.

In Figs. 4 and 5 the particular means are shown for rotating the shaft E (indicated in Fig. 1) which comprise ratchet mechanism to provide intermittent motion to the shaft E including a ratchet disc 35 which is fixed to shaft E having the same number of teeth as there are contacts in each of the contact sets in casings C, C1, C2, C3. The ratchet disc is rotated by a lever arm 36 which is pivotally mounted at one end on shaft E and carries at its other end a pivotally mounted pawl 37 for coacting with the teeth on the ratchet disc and which is intermittently pulled upwardly by means of a solenoid assembly 38 operated at a predetermined time when one of the mercury switches 27a or 28a controlled by the speed regulator A is tilted as heretofore described. A solenoid arm 39 is connected to lever arm 36 and pawl 37 and when the solenoid is energized by the mercury switch with which it is in circuit the solenoid arm is pulled upwardly and pivots the arm 36 about the shaft E which causes the pawl 37 to describe an arc and engage a tooth of the disc 35 to rotate the shaft E therewith. At this time provision is made for locking the ratchet disc before the solenoid becomes deenergized and to accomplish this a second disc 40 is fixed to shaft E in spaced relation with ratchet disc 35 and is provided with an equal number of teeth which cooperate with a pin 41 to effect the locking as shown in Fig. 4. The pin 41 is movably positioned on a plate 42 in guides 43 and the plate 42 is disposed back of or out of the path of travel of the solenoid arm 39 so as not to interfere with its movement.

Figure 5A:
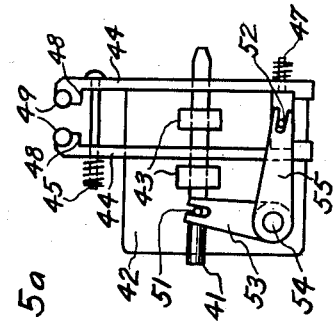
Fig. 5a is a detail of Fig. 5 with the parts in the position shown in Fig. 4.

The particular mechanism for locking the pin 41 in the toothed disc 40 is shown in Figs. 4 and 5 and shown with some of the parts removed in Fig. 5a in order to better indicate the relative position of parts of the mechanism. A pair of upright bracket arms 44—44 are disposed at opposite sides of the solenoid arm 39 and are held together at the top by a spring pressed bolt 45, which extends through the arms and through a transverse slot (indicated by dotted lines) in the upper end of solenoid arm 39. The lower ends of bracket arms 44 are also held together by a spring pressed bolt 47 which is disposed below and out of the downward path of travel of the solenoid arm 39. The upper ends of bracket arms 44 are flanged inwardly at 48 and are each preferably provided with rollers 49 which coact with studs 50 extending from a wall of the casing G and positioned directly above the flanged ends 48 as shown in Fig. 4. As the solenoid arms travel upwardly the bracket arms 44—44 and pin 45 are carried along therewith and when the rollers 49 contact the studs 50 the upper ends of the arms will spread outwardly as shown in Fig. 5 until the solenoid arm has reached its limit of upward movement and the flanges 48 at this time will be spread out of contact with the top of the solenoid arm. Since the bolt 45 will be at the upper end of the slot in the solenoid arm the arms will be free to fall until the bolt 45 reaches the bottom of the slot and the flange 48 will ride downwardly over the sides of the solenoid arm. Pivot pins 51 and 52 are provided respectively on the locking pin 41 and on the spring pressed bolt 47 for receiving respectively the forked end of a lever arm 53 which is fixedly mounted on a shaft 54 and the forked end of a lever arm 55, which is also fixedly mounted on shaft 54 but in spaced relation with lever 53. As the arms 44—44 fall from the solenoid arm 39 the locking pin 41 is forced into locking relation with toothed disc 40 through the assembly of levers 53 and 55 with pivot pins 51 and 52.

Referring to Fig. 5, the position of the parts just described for effecting the locking of the ratchet disc 35, will be as indicated with the locking pin 41 in released position when the solenoid arm 39 has reached its upper limit of movement and the ratchet disc has been advanced one notch. The solenoid arm 39 will be held in the position shown until the solenoid becomes deenergized but the arms 44 immediately begin to fall downwardly along the solenoid arm and may also be pulled by the return spring 56 on arm 55 until the various parts are positioned as shown in Fig. 4 with the pin 41 in locked position. When the solenoid later becomes deenergized the solenoid arm 39, the pivoted arm 36 and pawl 37, which are connected to the solenoid arm, will fall downwardly between the bracket arms 44—44 and the flanged ends 48 ride up over the sides of the solenoid arm until these flanged ends 48 rest on top of the solenoid arm as indicated in Fig. 4. The mechanism will remain in this position until the solenoid again becomes energized through its periodically operated mercury switch. A suitable dashpot 57 is connected to the solenoid arm 39 through a plunger 58 for cushioning the fall of the solenoid arm when the solenoid becomes deenergized.

In Figs. 6 and 7 are shown sectional views of one of the contact sets which are indicated diagrammatically by casings C, $C_1$, $C_2$, $C_3$ in Fig. 1. A panel board 65 is fixedly mounted in the casing C by studs 64, extending from a casing end wall, and shaft E extends through the panel and is rotatable in bearing 66—66 in the casing end walls. The panel board is provided with a plurality of concentric rows of contacts generally indicated at O for the outer row and T for the inner row for casing C. Each row may contain any desired number of contacts depending on the number of operations in any given process and lead wires will be attached to jacks 67 which extend from the contacts through the back of the panel. A pair of collector rings 68 and 69 are also provided and are disposed concentrically of the shaft E. A brush arm or energizer 70 is fixedly mounted on shaft E so as to be rotatable therewith and carries a brush assembly 71 at one end for contacting the outer row of contacts O and a brush assembly 72 at its other end for contacting the inner row of contacts T during the rotation of shaft E. Other brush assemblies 73 and 74 are also provided, the first of which is rotatable in contact with collector ring 69 and the second in contact with collector ring 68. The inner collector ring brush 74 and the brush 72 for the inner row of contacts T are connected together by link 75 while the outer collector ring brush 73 and the brush 71 for the outer row of contacts O are connected together by link 76, as indicated.

During rotation of the energizer 70 both sets of contacts O and T will be simultaneously energized so that a plurality of operations may be simultaneously carried out. It will be understood, of course, that each of the casings C, $C_1$, $C_2$, and $C_3$ will likewise be provided with the elements above described in connection with casing C.

In Figs. 8 and 9 are shown sectional views of the power selector casing B shown diagrammatically in Fig. 1. In Fig. 8 parts are shown broken away for the purpose of clarity. The particular selector shown comprises a panel 80 indicated only in Fig. 9 which is secured to the casing B by studs 81 and carries on one face and indicated only in Fig. 8, four outer selector segments X, $X_1$, $X_2$, $X_3$ and four inner selector segments Y, $Y_1$, $Y_2$, $Y_3$ and collector rings 82 and 83. A selector brush arm or energizer 84 having brush assemblies 85 and 86 for contacting, respectively, the outer segments X, $X_1$, $X_2$, $X_3$ and the inner segments Y, $Y_1$, $Y_2$, $Y_3$ is disposed adjacent the panel and is rotatable in bearings 87—87 in the casing end walls. Other brush assemblies 88 and 89 are carried by the energizer or brush arm 84 and contact, respectively, the collector rings 82 and 83. Links 90 and 91 are provided on the brush arm for connecting the outer brush assemblies 85 and 88 and for connecting the inner brush assemblies 86 and 89, respectively. Each of the power selector segments X, $X_1$, $X_2$, $X_3$, is in circuit with one of the inner or outer contact sets in casing C, $C_1$, $C_2$, $C_3$, described in connection with Fig. 1, and each of the power selector segments Y, $Y_1$, $Y_2$, $Y_3$ is in circuit with the other of the contact sets in these casings and current is distributed sequentially from the selectors to the contact sets through the energizer or brush arm 70 which is in circuit with the selectors. Since each selector defines only a portion or arc of a circle and since each contact set defines a complete circle, it is evident that the selector brush arm or energizer 84 must be rotated more slowly over the distributor segments than the contact brush arms or energizers over the contact sets. If a separate power means is utilized for rotating more slowly the selector brush arm 84, the spacings between the selector segments must be correspondingly smaller than the spacings between the contacts of the contact sets or, conversely, the spacings of the contact sets must be made correspondingly larger. From a practical standpoint the spacings of the contact sets are made as small as possible in order to utilize space and still prevent arcing between contacts when the contact brush arm is rotating and consequently when the spacing for the selector segments is smaller than the spacing between the contacts of the contact sets arcing would occur in the selector segments when the selector brush arm is rotated. In order to overcome this problem and permit the same spacing between the selector segments as is provided between the contacts, the shaft E, which rotates the contact brush arms for the contact sets is arranged to rotate the selector brush arm 84 at a slower and at an irregular speed over the distributor segments.

The arrangement for rotating the selector arm 84 at a slower and irregular speed consists of a geneva type gearing which includes a plate 92 fixed to shaft E to be driven therewith and has a gear tooth in the form of a pin 93 secured near its outer edge. A cooperating geneva plate 94 is rotatably mounted on a wall of casing B by means of stud 95 disposed above the shaft E and this plate is provided with four inwardly extending slots 96, one of which receives the pin 93 of plate 92 during each revolution of shaft E. A gear wheel 97 is rigidly connected with the geneva plate 94 and is likewise rotated therewith for a quarter of a revolution during each revolution of shaft E. A second gear wheel 98 is loosely mounted on shaft E and meshes with gear wheel 97 causing the selector arm 84 through the connecting hub 99 to turn one quarter revolution for each revolution of shaft E. The slots 96 in geneva plate 94 give a slow movement to the selector arm 84 when the pin 88 enters one of the slots and speeds up its movement as the pin advances in the slot toward the center of the plate 94. The pin 93 on plate 92 and the slots 96 in geneva plate 94 are positioned relatively to each other so that the geneva plate is given its rapid movement when the selector brush arm passes from one selector segment to another and the speed of its rotative movement at this time will be at least as great as the speed of rotation of the contact brush arms in order that current will always flow from a selector segment to one of the contact sets.

Current to the selector brush arm 84 will preferably be supplied intermittently from the power source in order that the contacts of a contact set will be only momentarily energized by its power selector. This intermittent supply of current will take place after the ratchet disc has been advanced one step by the solenoid 38 when it is energized through the tilting of one of the mercury switches 27a or 28a as heretofore mentioned. The other mercury switch will be in circuit with the power source and the selector brush arm 84 and as it is tilted by shaft 26 current will pass to the distributor segments.

Figure 10:
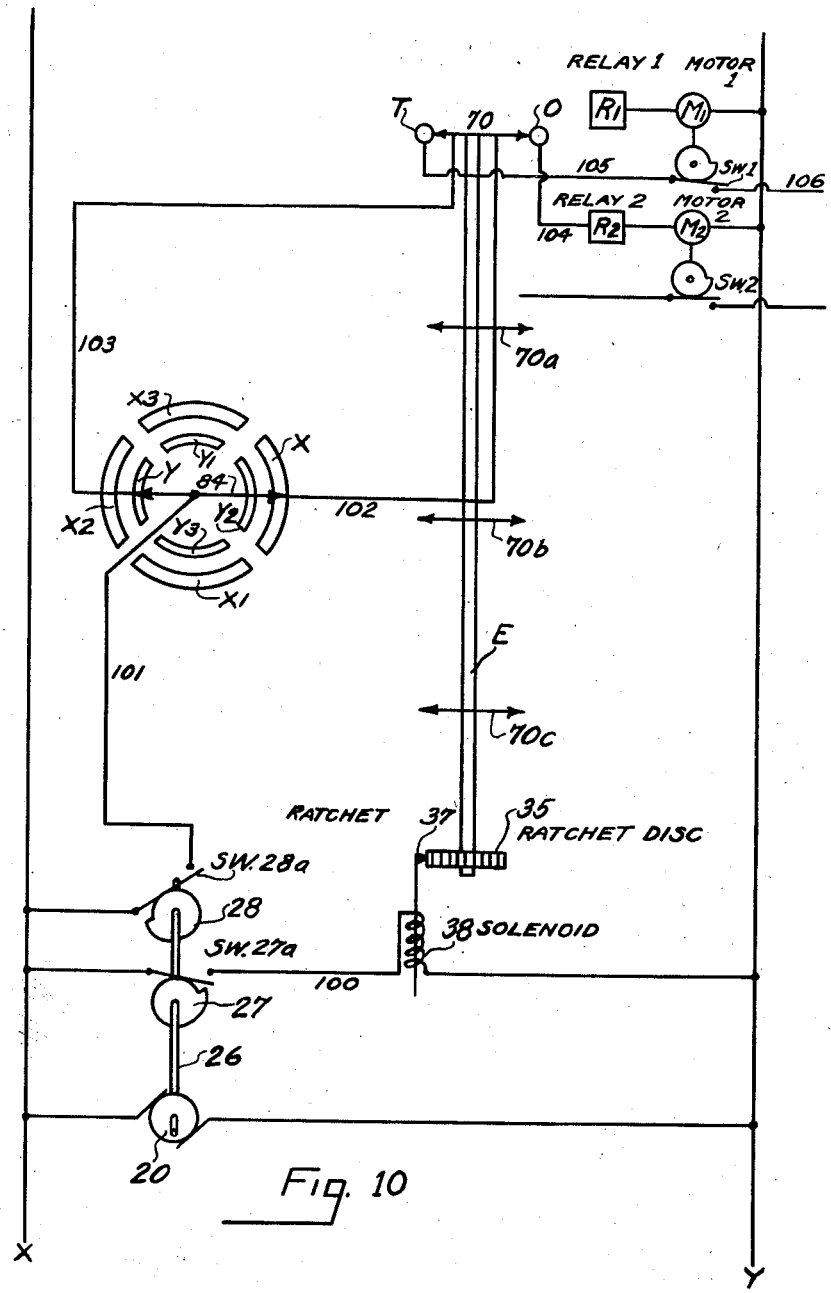
Fig. 10 is a wiring diagram of the system with various parts shown diagrammatically.

In Fig. 10 is shown a wiring diagram of circuits connecting the various parts of the apparatus which have just been described. The diagram shows the apparatus applied to a particular system for controlling valve operations in order to describe one application of the present invention but it is to be understood that the invention is not limited to this type of control.

Referring to Fig. 10, the motor 20 will be set to rotate the shaft 26 at the desired speed in order to effect the tilting of mercury switches 27a and 28a in alternation through the cams 27 and 28 at the proper time intervals. Through mercury switch 27a current will be supplied from bus line X through wire 100 for energizing the solenoid 38 and cause rotation of the ratchet disc 35 through actuation of ratchet pawl 37 and through mercury switch 28a current will be supplied from bus line X through line 101 to the selector brush arm 84 for energizing simultaneously one of the inner and one of the outer selector segments, for example, X and Y, as indicated. Continuous rotation of shaft 26 in a clockwise direction will intermittently rotate the contact brush arms which are carried by shaft E and at a predetermined period later it will intermittently energize an inner and outer selector segment for supplying current sequentially to an outer contact O through line 102 and an inner contact T through line 103 of a contact set. In the figure electrical connections are shown only from one set of selector segments to one contact set but it will be understood that the other distributor segments will be connected in a similar manner with the other contact sets.

As heretofore stated the apparatus as shown in Fig. 10 is applied to a particular system of control which involves a plurality of valve operations effected in sequence to carry out the steps of a process and wherein it is essential that a certain valve or certain valves shall have completed their operations before another valve is placed in operating condition. This is accomplished by providing a test for each valve operation or at least a test for certain of the valve operations. In the figure the outer row of contacts O indicate the operating contacts for supplying current to operate the valves while the inner row of contacts T indicate the test contacts for supplying current to effect the test of the valve operations and $M_1$ and $M_2$ are the valve motors which are started when the relays $R_1$ and $R_2$ are energized through a contact O. Consider the motor $M_1$ to have been started and that the arm 70 has reached the next O and T contacts, current will then pass to relay $R_2$ through line 104 and motor $M_2$ will start to operate its valve; at the same time current from T will pass directly through line 105 to switch $SW_1$ which is controlled by the operation of the valve previously actuated by motor $M_1$. If the switch $SW_1$ is open as indicated it will show that the valve has operated properly and no current will pass to the power control line 106, but if the switch $SW_1$ is closed, it will indicate that the valve has not operated properly and current will pass through the switch $SW_1$ to the control line 106 which may be arranged to stop the movement of the contact brush arm and thus prevent any more valve operations while permitting correction of the valve which has not operated properly.

What I claim is:

1. A timer for controlling the operation of a plurality of devices cyclically which comprises operating means for each device, a plurality of discs each having a set of contacts in circuit with said operating means, an energizing arm for each set of contacts, time-controlled operating means for moving each energizer step by step in engagement sequentially with the contacts of its set, an independent power selector in circuit with each energizer, an electrical power source, means for supplying power from said source to each selector, and means for transferring power from one selector to another selector when an energizing arm has engaged all the contacts of a set.

2. A timer for controlling the operation of a plurality of devices cyclically which comprises operating means for each device, a plurality of discs each having a set of contacts thereon with contacts of each set in circuit with the valve operating means, an energizer for each contact set, a time controlled ratchet for intermittently rotating said energizers in engagement with said contacts, an independent power selector in circuit with each energizer, an electrical power source, means for supplying power to each selector at timed intervals after the energizers have been rotated by said ratchet and means for supplying power to the selectors in sequence.

3. A timer for controlling the operation of a plurality of devices cyclically which comprises operating means for each device, a plurality of discs each having a set of contacts thereon with contacts of each set in circuit with the valve operating means, an energizer for each contact set, a ratchet for rotating said energizers in engagement with said contacts, motor means for operating said ratchet, an electrical power source, an independent power selector in circuit with each energizer, means for supplying power to the selectors at timed intervals and means for operating the ratchet motor means intermittently and alternately with the power supplying means.

4. An automatic device for controlling a cycle of valve operations comprising operating means for each valve, a plurality of discs each having a set of contacts thereon with contacts of each set in circuit with the valve operating means, an energizer for each contact set, a ratchet for rotating said energizers in engagement with said contacts, motor means for operating said ratchet, an electrical power source, an independent power selector in circuit with each energizer, means for supplying power to the selectors, means for operating said ratchet motor means intermittently and means for locking the ratchet in position after each operation.

5. An automatic device for controlling a cycle of valve operations comprising operating means for each valve, a plurality of discs each having a set of contacts thereon with contacts of each set in circuit with the valve operating means, an energizer for each set, a ratchet for rotating said energizers in engagement with said contacts, a solenoid assembly including a solenoid arm for operating said ratchet, an electrical power source, an independent power selector in circuit with each energizer, means for supplying power to the selectors at timed intervals and means for energizing the solenoid at timed intervals to operate the solenoid arm.

6. An automatic device for controlling a cycle of valve operations comprising operating means for each valve, indicating means for each valve, a plurality of timing discs each having an inner and outer row of contacts, one of said contact rows being in circuit with said operating means and one row in circuit with said indicating means, an energizing arm for each of said timing discs to simultaneously engage a contact of each of said inner and outer rows, a ratchet for rotating said energizers in engagement with said contacts, motor means for operating said ratchet, an independent power selector in circuit with each energizer, an electrical power source, means for supplying power to the selectors at timed intervals, means for operating the ratchet motor means intermittently and means for locking the ratchet after each operation.

7. An automatic device for controlling a cycle of valve operations comprising operating means for each valve, a plurality of discs each having a set of contacts thereon with contacts of each set in circuit with the valve operating means, an energizer for each contact set, a ratchet for rotating said energizers in engagement with said contacts, a solenoid assembly including a solenoid arm for operating said ratchet, an electrical power source, an independent power selector in circuit with each energizer, means for actuating the solenoid arm, other means for later supplying power to the selectors and means controlled by the solenoid arm for locking the ratchet after each operation.

8. An automatic device for controlling a cycle of valve operations comprising operating means for each valve, a plurality of contact sets with contacts of each set being in circuit with said valve operating means, an energizer for each contact set, an independent power selector for each energizer, an electrical power source, driving means for the energizers, switch means for intermittently operating said driving means, other switch means between said source and said selectors for intermittently supplying power thereto, and control means for opening and closing both said switch means at timed intervals.

9. An automatic device for controlling a cycle of valve operations comprising operating means for each valve, a plurality of contact sets with contacts of each set being in circuit with said valve operating means, an energizer for each contact, an independent power selector for each energizer, an electrical power source, driving means for said energizers, switch means for intermittently operating said driving means, other switch means between said source and said selectors for intermittently supplying power thereto, cam means for opening and closing both said switch means, said cam means being time controlled to actuate the switches in alternation.

10. An automatic device for controlling a cycle of valve operations comprising operating means for each valve, a plurality of contact sets with contacts of each set being in circuit with said valve operating means, an energizer for each contact set, an independent power selector for each energizer, an electrical power source, driving means for said energizers, switch means for intermittently operating said driving means, other switch means between said source and said selector for intermittently supplying power thereto, cam means for opening and closing both said switch means, a shaft for said cams and time controlled means for actuating said shaft.

11. An automatic device for controlling a cycle of valve operations comprising operating means for each valve, a plurality of timing discs having a row of contacts in circuit with said operating means, an energizer for each set of contacts, time-controlled means for rotating each energizer in engagement sequentially with the contacts of a set, an independent power selector in circuit with each energizer, an electrical power source, a selector arm for supplying power from said source to said selectors and means to rotate said selector arm from one selector to another after one revolution of the energizers.

12. An automatic device for controlling a cycle of valve operations comprising operating means for each valve, a plurality of timing discs each having a row of spaced contacts in circuit with said operating means, a rotatable shaft, an energizer for each timing disc on said shaft, time controlled means for rotating said energizers through said shaft in sequential engagement with the contacts of each row, a plurality of spaced power selectors, each of said selectors being in circuit with an energizer, an electrical power source, a selector arm for supplying power from said source to said selectors, geneva gear means between said shaft and said selector arm, said gear means being adapted to rotate said selector arm at a slow rate over the selectors and at a rapid rate between the selectors.

GUSTAVE D. STAHL.